May 10, 1938.  S. P. TSCHAPPAT  2,116,856
CASING AND TUBING HEAD
Filed Aug. 7, 1936
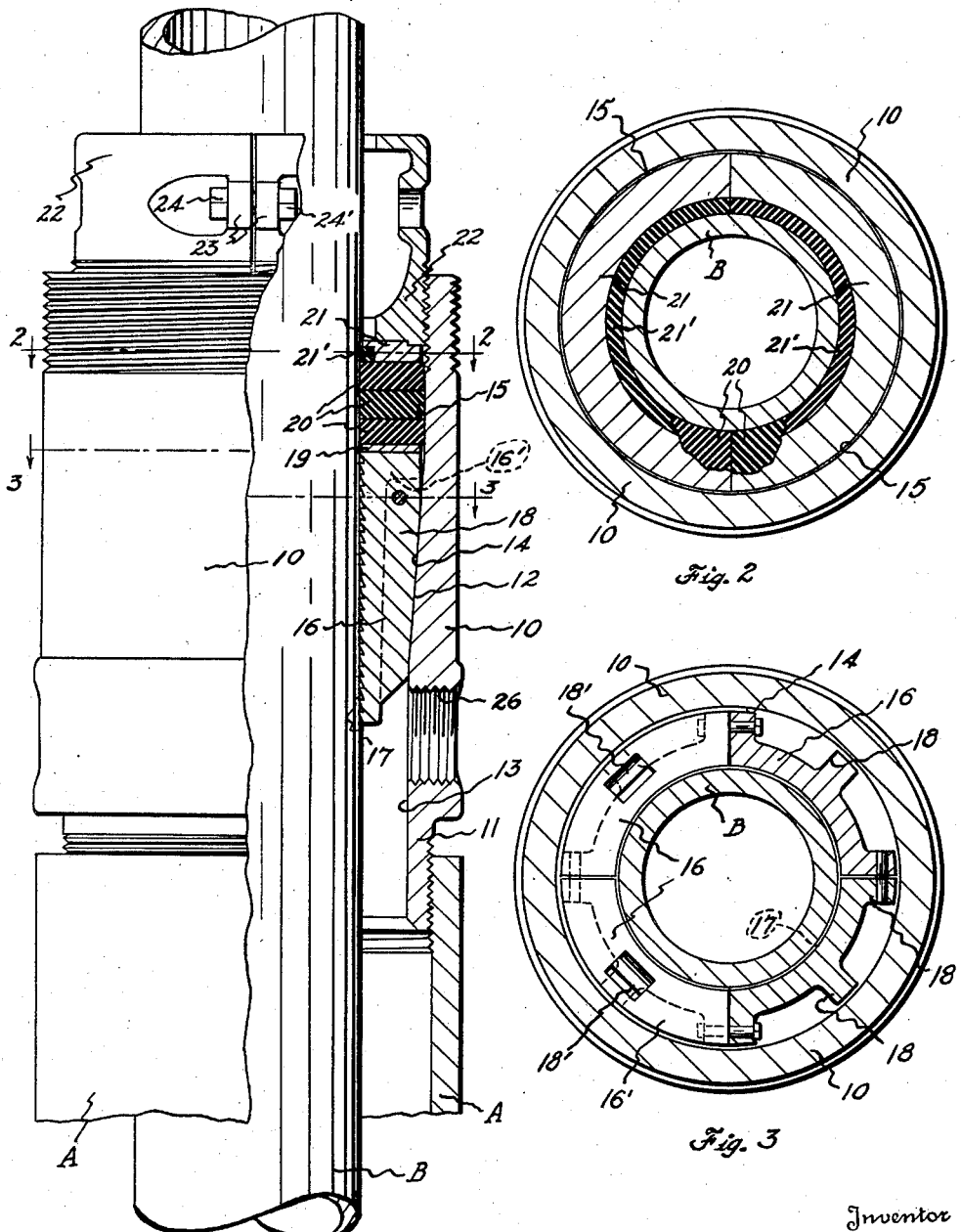

Patented May 10, 1938

2,116,856

UNITED STATES PATENT OFFICE 2,116,856

CASING AND TUBING HEAD

Sheridan P. Tschappat, Tulsa, Okla.

Application August 7, 1936, Serial No. 94,855

1 Claim. (Cl. 166—14)

This invention relates to new and useful improvements in casing and tubing heads.

One object of the invention is to provide an improved head wherein the tubing load is carried entirely upon slips and the slips are arranged to support the packing means so as to assure an effective seal at all times and under varying conditions, as well as permitting repacking without elevating or additionally supporting the tubing.

An important object of the invention is to provide a head wherein the packing means is carried solely by the slips and provision is made to allow the packing means to follow the slips in their vertical seating variations, due to irregularities in tubing diameters, whereby an effective seal is provided between the tubing and the housing irrespective of the elevation of the tops of the slips.

Another object of the invention is to provide in combination a split gland nut or ring having screw threaded engagement with the housing, a split metallic follower ring interposed between the gland nut and the elastic packing, whereby the packing may be distorted without marring the elastic packing, and also whereby the nut may be disassembled to remove it from the tubing.

A further object of the invention is to provide a head including a housing having a tapered or inclined annular slip seat and a cylindrical packing surface joined therewith without a packing shoulder, whereby both the slips and packing may undergo vertical adjustments without interfering with their effective operations.

A still further object of the invention is to provide a head wherein the elastic packing means is carried solely by the slips, and a rigid member interposed between the slips and said packing means, whereby misalignment in a horizontal plane of the upper ends of the slips will not affect the sealing effectiveness of the packing means.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view, partly in elevation and partly in vertical section, showing a head constructed in accordance with the invention, Figure 2 is a horizontal, cross-sectional view taken on the line 2—2 of Figure 1, and Figure 3 is a similar view taken on the line 3—3 of Figure 1.

In the drawing, the numeral 10 designates a cylindrical body or housing having an externally screw threaded nipple 11 depending from its end, whereby the housing may be connected to the upper end of a casing A or other support. The housing is formed with an internal annular bowl 12 located intermediate its end, and an axial bore 13 extends downwardly from lower end of the bore 14 of said bowl through the nipple 11. The bore 14 of the bowl is tapered or inclined, being enlarged toward its upper end, which end merges into an axial bore 15 in the upper end of the housing. The well tubing B extends through the housing and bowl as shown.

Elongate gripping slips 16, provided on their inner arcuate faces with upwardly inclined serrations or teeth 17 for gripping the tubing B, are supported within the inclined bore 14 of the bowl. The slips are shown as four in number suitably connected together and a flange 16' is provided at the upper end of each slip. Each slip is provided on its rear or outer face with a plurality of supporting ribs 18 extending from the flange 16' to the lower end of the slip, and these ribs have an inclination complementary to the taper of the bore 14 of the bowl. The bore 14 acts as an annular slip seat, whereby as the slips move vertically within the bowl, the taper of the bore causes radial movement of said slips, thereby moving the gripping teeth 17 of the same into or out of engagement with the tubing B extending through the housing. Suitable openings 18' are formed in the flange of each slip whereby suitable means (not shown) may be readily attached to each slip to remove the same from the bowl.

A split metallic supporting ring 19 rests upon the upper ends of the slips and its halves encircle the tubing B. Overlying the metallic supporting ring 19, a plurality of split elastic packing rings 20, made of rubber or other suitable material, also encircle the tubing and lie within the space formed between the tubing and the upper bore 15 of the housing. A split metallic follower ring 21, having an hydraulic packing insert 21' provided on its inner periphery, is positioned on top of the packing rings 20, as shown in Figure 1 and also lies within the bore 15 of the housing.

A diametrically split gland nut or ring 22 is threaded or otherwise adjustably mounted within the upper end of the housing, and, when screwed downwardly into the housing, engages the upper surface of the follower ring 21 as shown. Outwardly extending ears or lugs 23 are provided on the outer periphery of each half of the gland nut 22 and the lugs have registering openings provided therein through which bolts 24 may be passed. The bolts receive nuts 24' to securely fasten the halves of the gland nut together. The provision of the split gland permits said gland to be readily removed from or placed around the tubing B at any point therealong.

Radial ports or outlets 26 are provided in the housing wall below the lower end of the bowl 12, and are internally screw threaded to receive outlet pipes (not shown) or other conductors, whereby fluid from the casing A may be conducted therefrom.

In operation, the slips 16 seat on the tapered bore of the bowl and their gripping teeth 17 engage the tubing B extending through the housing. The weight of the tubing is thus placed on the slips and serves to wedge said slips firmly in the bowl, whereby the tubing is suspended or hung from the slips. It is noted that the diameter of the tubing B controls the elevation of the slips within the bowl. In gripping the size tubing shown in the drawing, the upper ends of the slips are located within the lower end of the bore 15 of the housing. If a smaller tubing extended through the housing, the slips would, of course, be in a lower position.

After the slips have been seated in the bowl and are supporting the tubing, the split metallic supporting ring 19 is placed in position on the upper ends of the slips, and the elastic packing rings 20, and follower ring 21 are then placed within the housing. The split gland nut 22 is then assembled around the tubing and screwed into the housing where it engages the follower ring 21. It will be seen that, since the elastic packing rings 20 are confined between the supporting ring 19 resting on the upper ends of the slips and the follower ring, downward movement of the gland nut will distort the rings 20, causing both inward and outward displacement thereof, whereby said rings will engage the tubing B and the bore 15 of the housing and form a seal therebetween.

It is noted that, in case of further downward movement of the slips and tubing for any reason, it will only be necessary to screw the compression gland nut 22 further into the housing to again effect a seal. It is further noted that the slips are firmly held in their seated position due to the compressing action of the gland nut and cannot, therefore, be displaced upwardly without first removing the gland nut. It is also noted that, since the gland nut 22 does not engage the packing rings 20 but acts through the follower ring 21, movement of the gland nut to cause distortion of the packing rings does not mar or otherwise damage said rings. The provision of the supporting ring 19 on the upper ends of the slips serves to prevent breakage of the seal effected by the elastic packing rings due to misalignment in a horizontal plane of the upper ends of the slips as said slips grip the tubing. It is noted that in case of such misalignment the supporting ring assumes only a slight inclination and the packing rings are thereby prevented from assuming a shape conforming to the upper ends of the misalined slips, whereby, an effective seal is maintained.

In case the elastic packing rings become worn or otherwise necessitate replacement, it will be seen that the gland nut 22 may be removed from the housing and slid upwardly on the tubing. The halves of the follower ring may then be removed from the housing, permitting replacement of the elastic packing rings 20 without necessitating removal of the supporting slips. After the packing rings have been replaced the follower ring is reinserted and the gland nut replaced and screwed into sealing position. It is noted that, if desired, after the gland nut 22 has been removed from the housing, the bolts 24 may be removed from the ears 23 and the halves of said gland nut disassembled from around the tubing B. Since the slips grip the tubing, due to the taper of the bowl, it is seen that downward movement of said tubing is prevented and no auxiliary holding means is necessary when replacing the packing rings.

What I claim and desire to secure by Letters Patent, is:

A casing head including, an elongate cylindrical body having a tapered bore intermediate its ends and provided with a reduced bore at the lower end of its tapered bore, the body having an enlarged annular bore at its upper end continued from the upper end of the tapered bore and free from a shoulder or projection at the intersection with said tapered bore, slips mounted in the tapered bore of the body and extending into the upper enlarged bore thereof for engaging around a pipe passing through the body, annular packing rings resting upon the slips in the upper bore of the body, said packing rings being free to slide down into the tapered bore without obstruction from the body, a split metallic follower ring resting upon the elastic packing rings and unrestricted to follow said rings downwardly, a packing insert in the follower ring for engagement with a pipe and overlying the elastic packing rings, the extreme upper end of the body having internal screw-threads extending to the top thereof, and a gland nut engaging in said threads within the bore of the body, the nut having an amplified base for engaging the follower ring and substantially filling the space between the body and a pipe passing through said body, whereby the entire follower ring is evenly forced downward, the upper end of the body being externally screw-threaded for receiving a fitting.

SHERIDAN P. TSCHAPPAT.